US 9,921,917 B2

(12) United States Patent
Breedvelt-Schouten et al.

(10) Patent No.: US 9,921,917 B2
(45) Date of Patent: *Mar. 20, 2018

(54) UNDO STACK TO EXPLORE PAST ACTIONS IN BUSINESS ANALYTICS

(71) Applicant: International Business Machines Corporation, Armonk, NY (US)

(72) Inventors: Ilse M. Breedvelt-Schouten, Manotick (CA); Jana H. Jenkins, Raleigh, NC (US); Jeffrey A. Kusnitz, Campbell, CA (US); John A. Lyons, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/379,560

(22) Filed: Dec. 15, 2016

(65) Prior Publication Data

US 2017/0091043 A1 Mar. 30, 2017

Related U.S. Application Data

(63) Continuation of application No. 15/085,058, filed on Mar. 30, 2016, now Pat. No. 9,612,911, which is a continuation of application No. 14/809,493, filed on Jul. 27, 2015.

(51) Int. Cl.
G06F 17/30 (2006.01)
G06F 11/14 (2006.01)
G06Q 10/06 (2012.01)

(52) U.S. Cl.
CPC ....... *G06F 11/1446* (2013.01); *G06Q 10/063* (2013.01)

(58) Field of Classification Search
CPC .... G06Q 10/103; G06Q 40/12; G06Q 10/063; G06F 3/0482; G06F 3/0484;
(Continued)

(56) References Cited

U.S. PATENT DOCUMENTS 5,479,601 A 12/1995 Matheny et al.
5,860,071 A 1/1999 Ball et al.
(Continued)

FOREIGN PATENT DOCUMENTS

EP 1780637 A1 5/2007

OTHER PUBLICATIONS

Chaudhuri et al., "An Overview of Business Intelligence Technology", Communications of the ACM, vol. 1, No. 8, pp. 88-98, Aug. 2011, ACM.*

(Continued)

*Primary Examiner* — Tyler Torgrimson
(74) *Attorney, Agent, or Firm* — William H. Hartwell

(57) ABSTRACT

A computer system for using an undo stack to explore past actions and apply new actions to previous states in a data view is provided. The computer system includes program instructions to detect a change in an application data view. The application then displays an undo stack and stores the data change in the application data view to the undo stack. Upon detecting a selection of the undo stack entry for undo, the application returns the application data view to the state represented by the undo stack entry. The computer system further includes program instructions to provide a user interface allowing a user to perform operations on undo stack entries. Responsive to the user utilizing the user interface and making selections, the application then adjusts the application data view state based on the performed actions.

1 Claim, 9 Drawing Sheets

(58) Field of Classification Search
CPC ........... G06F 11/1446; G06F 17/30395; G06F 17/451; G06F 17/867; G06F 2201/84
See application file for complete search history.

(56) References Cited

U.S. PATENT DOCUMENTS

| | | |
|---|---|---|
| 6,453,328 B1 | 9/2002 | Schaeffer et al. |
| 7,979,804 B1 | 7/2011 | Schang |
| 8,190,633 B2 | 5/2012 | Freire et al. |
| 8,719,315 B2 | 5/2014 | Schuler et al. |
| 8,930,331 B2 | 1/2015 | McGrew et al. |
| 8,972,443 B2 | 3/2015 | LaRowe et al. |
| 2004/0181440 A1 | 9/2004 | Yeh et al. |
| 2007/0244935 A1 | 10/2007 | Cherkasov |
| 2008/0046809 A1 | 2/2008 | Oshima et al. |
| 2010/0268691 A1 | 10/2010 | Grinstein et al. |
| 2011/0107246 A1 | 5/2011 | Vik |
| 2011/0113326 A1 | 5/2011 | Baer |
| 2012/0047434 A1 | 2/2012 | Ginetti |
| 2015/0039566 A1* | 2/2015 | Baumann ............... G06F 9/4443 707/684 |
| 2016/0147786 A1 | 5/2016 | Andrei et al. |

OTHER PUBLICATIONS

Silva et al., "Software Infrastructure for Exploratory Visualization and Data Analysis: Past, Present, and Future", Journal of Physics: Conference Series 125 (2008), © 2008 IOP Publishing Ltd, pp. 1-15.

Whitehead, "World Wide Web Distributed Authorizing and Versioning (WebDAV): An introduction", StandardView, vol. 5, No. 1, pp. 3-8, 1997, ACM.

Chen et al., "Ciao: A Graphical Navigator for Software and Document Repositories", Proceedings of the International Conference on Software Maintenance, pp. 66-75, 1995, IEEE.

Kahn et al., "Data Analysis through information Visualisation for eGovernments & eBusinesses", 2013 Sixth International Conference on Developments in eSystems Engineering, pp. 215-220, 2014, IEEE.

U.S. Appl. No. 14/809,493, filed Jul. 27, 2015.
U.S. Appl. No. 15/085,058, filed Mar. 30, 2016.
U.S. Appl. No. 15/378,090, filed Dec. 14, 2016.
Appendix P List of IBM Patents or Applications Treated as Related. Dated Dec. 14, 2016. Two pages.

* cited by examiner

| | | 2004 322 | Jan-2004 326 | Feb-2004 328 | Mar-2004 330 |
|---|---|---|---|---|---|
| Board of Directors | | 836,013 | 75,826 | 63,703 | 67,028 |
| Bank Charges | | 938,035 | 81,045 | 84,515 | 80,666 |
| ⊛ Other Expenses | | 14,432,325 | 1,203,026 | 1,191,894 | 1,212,094 |
| Other Costs | | 30,556,197 | 2,296,037 | 2,588,205 | 2,487,410 |
| Direct Cost | | 35,076,446 | 2,926,898 | 2,731,006 | 2,825,543 |
| Other Revenue | | 60,378,719 | 4,715,022 | 5,198,069 | 4,988,755 |
| ⊛ Operating Expense | | 60,989,300 | 4,973,948 | 5,124,268 | 5,226,065 |
| ⊛ COS | | 65,632,644 | 5,222,935 | 5,319,211 | 5,312,953 |
| ⊛ Net Operating Income | | 76,924,539 | 5,459,262 | 6,647,261 | 6,401,212 |
| Sales | | 143,167,764 | 10,941,123 | 11,892,670 | 11,951,475 |
| ⊛ Revenue | | 203,546,482 | 15,656,145 | 17,090,740 | 16,940,230 |

FIG. 3D

UNDO STACK TO EXPLORE PAST ACTIONS IN BUSINESS ANALYTICS

BACKGROUND

The present invention relates generally to the field of business analytics, and more particularly to the use of an undo stack to explore past actions in a business analytics view.

Generally speaking, business analytics (BA) refers to the skills, technologies, and practices for continuous iterative exploration and investigation of past business performance to gain insight and drive business planning. In many cases, business analytics focuses on developing new insights and understanding of business performance based on data and statistical methods. Examples of business analytics include exploring data to discover new patterns and relationships (i.e., data mining), explaining why certain business results occurred (i.e., statistical analysis), and forecasting future business results (i.e., predictive modeling, or predictive analytics).

SUMMARY

Embodiments of the present invention disclose a method, computer program product, and system for using an undo stack to explore past actions and apply new actions to previous states in a data view. The method includes detecting a change in an application data view. The application then displays an undo stack and stores the data change in the application data view to the undo stack. Upon detecting a selection of the undo stack entry for undo, the application returns the application data view to the state represented by the undo stack entry. The method further includes providing a user interface allowing a user to perform operations on undo stack entries. Responsive to the user utilizing the user interface and making selections, the application then adjusts the application data view state based on the performed actions.

BRIEF DESCRIPTION OF THE DRAWINGS

FIG. 3D is an example business analytics software data view with an undo stack, on a computer within the analytics data processing environment of FIG. 1, displaying the action taken on a previous view in the undo stack, in an embodiment in accordance with the present invention.

DETAILED DESCRIPTION

Embodiments in accordance with the present invention use an undo stack to explore past actions and/or apply new actions to previous states in business analytics data views. In business analytics data views, many items can be modified by the user. Working with multiple data views of an application sometimes results in users losing a data view when switching to another view. Returning back to a previous view may require the application to repopulate the view with the previous data all over again. Another drawback is that a user might not be able to see that an action has taken place on a data view once the user switches to a new view. This can be cumbersome when switching back and forth between data views is necessary for completing a task. Sometimes the change in the data view is a small number change (e.g., a single data value change) and sometimes the change is a small structure change (e.g., copy and paste of a set of data) that is applied to the data view. Transitions can be shown to users, for example by using animations, but known animations do not inform the user that a new action has been applied, and that the user can undo the applied action. There is a need in business analytics applications to have a method that combines working with an undo stack to show a user what actions have taken place and performing actions to return to past states or otherwise use past action information in helpful ways.

Figure 1:
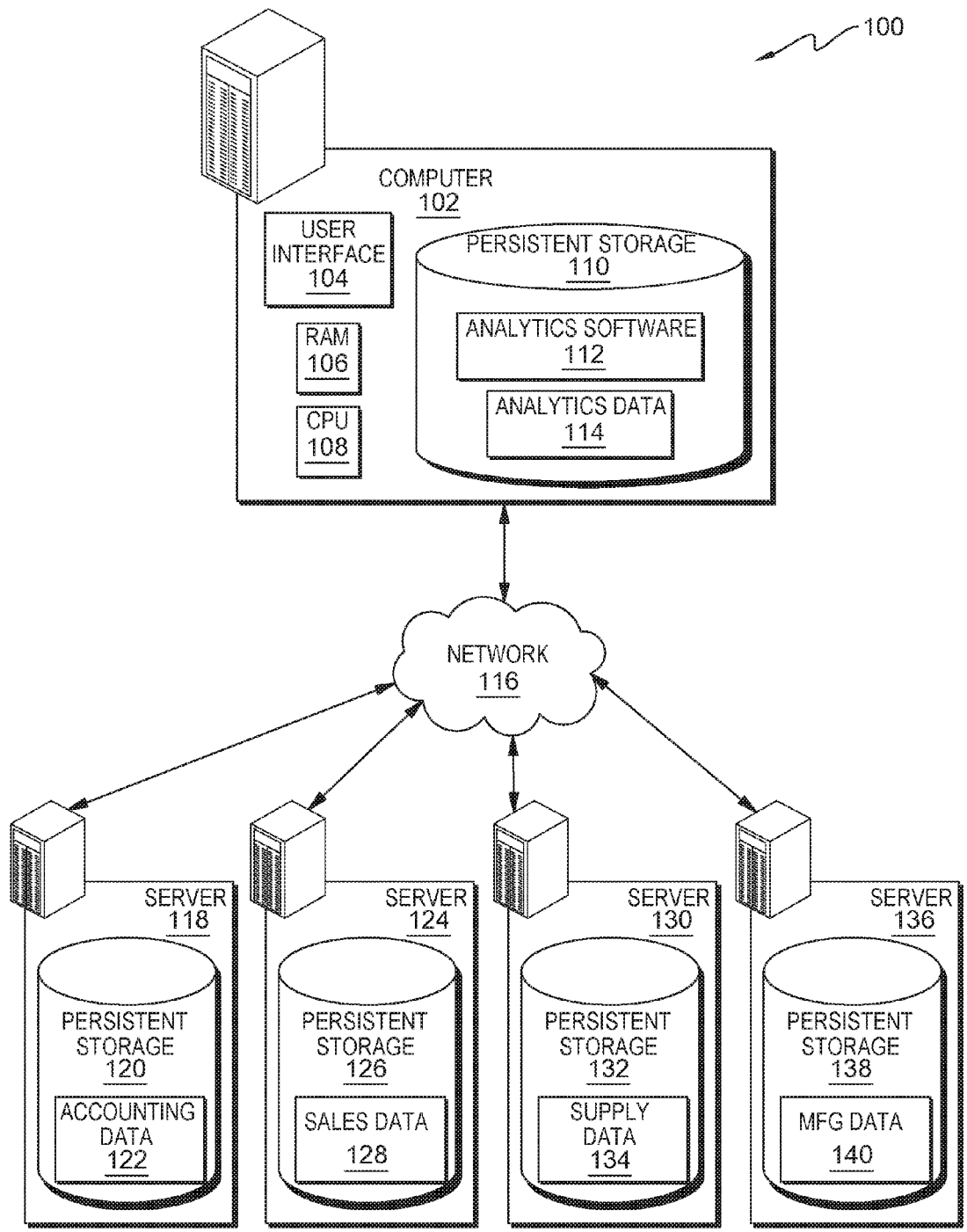
FIG. 1 is a functional block diagram illustrating an analytics data processing environment, in an embodiment in accordance with the present invention.

Embodiments in accordance with the present invention will now be described in detail with reference to the Figures. FIG. 1 is a functional block diagram, generally designated 100, illustrating an analytics data processing environment, in an embodiment in accordance with the present invention.

Analytics data processing environment 100 includes computer 102 and servers 118, 124, 130 and 136, all interconnected over network 116. Computer 102 includes user interface (UI) 104, random access memory (RAM) 106, central processing unit (CPU) 108, and persistent storage 110. Computer 102 may be a Web server, or any other electronic device or computing system, capable of processing program instructions and receiving and sending data. In some embodiments, computer 102 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, computer 102 may represent server computing systems utilizing multiple computers as a server system, such as in a distributed computing environment. In general, computer 102 is representative of any electronic devices or combinations of electronic devices capable of executing machine-readable program instructions and communicating with servers 118, 124, 130 and 136 via network 116 and with various components and devices within analytics data processing environment 100.

Computer 102 includes user interface 104. User interface 104 is a program that provides an interface between a user of computer 102 and a plurality of applications that reside on computer 102 (e.g., analytics software 112), and/or applications on computing devices that may be accessed over a data connection on network 116. A user interface, such as user interface 104, refers to the information (e.g., graphic, text, sound) that a program presents to a user and the control sequences the user employs to control the program. User interface 104 is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. A variety of types of user interfaces exist. In one embodiment, user interface 104 is a graphical user interface (GUI). In another embodiment, user interface 104 may be a web user interface (WUI) and can display text, documents, web browser windows, user options, application interfaces, and instructions for operation, and includes the information (such as graphic, text, and sound) that a program presents to a user and the control sequences the user employs to control the program. User interface 104 may also be mobile application software that provides an interface between a user of computer 102 and server 118, 124, 130, and 136 over a data connection on network 116. Mobile application software, or an "app," is a computer program designed to run on smart phones, tablet computers and other mobile devices. User interface 104 enables a user of computer 102, and analytics software 112, to explore the undo stack to view previous actions and states, and return or apply an action to a previous state.

Computer 102 includes persistent storage 110. Persistent storage 110 may, for example, be a hard disk drive. Alternatively, or in addition to a magnetic hard disk drive, persistent storage 110 may include a solid state hard drive, a semiconductor storage device, read-only memory (ROM), erasable programmable read-only memory (EPROM), flash memory, or any other computer-readable storage medium that is capable of storing program instructions or digital information. Analytics software 112 and analytics data 114 are stored in persistent storage 110, which also includes operating system software, as well as software that enables computer 102 to perform one or more operations on analytics data 114 using user interface 104, and communicate with servers 118, 124, 130 and 136, as well as other computing devices of analytics data processing environment 100 over a data connection on network 116.

Analytics software 112 is stored in persistent storage 110 and is used to view, add, edit, or delete data in analytics data 114 and/or from accounting data 122, sales data 128, supply data 134, and manufacturing data 140. Analytics software allows a user of computer 102 to save data views (with previous actions and states) on an undo stack. Analytics software 112 also allows a user to save pending actions on the saved data views of the undo stack, to be performed or modified at a later time. Analytics data 114 is also stored in persistent storage 110 and contains analytic data from accounting data 122 on server 118, sales data 128 on server 124, supply data 134 on server 130, and manufacturing data 140 on server 136.

Figure 5:
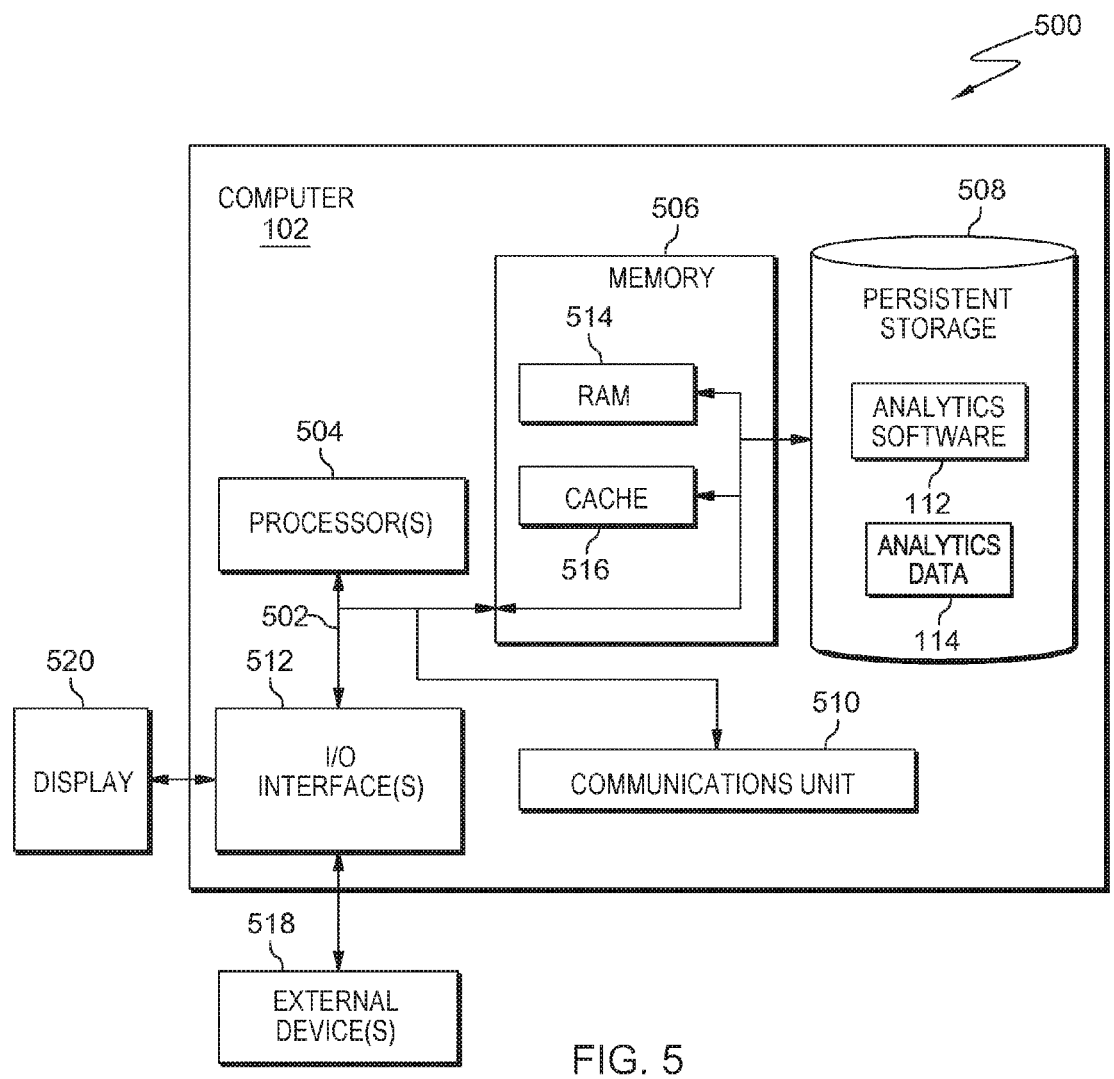
FIG. 5 depicts a block diagram of components of the computer executing the analytics software, in an embodiment in accordance with the present invention.

Computer 102 may include internal and external hardware components, as depicted and described in further detail with respect to FIG. 5.

In FIG. 1, network 116 is shown as the interconnecting fabric between computer 102, and servers 118, 124, 130 and 136. In practice, network 116 may be any viable data transport network. Network 116 can be, for example, a local area network (LAN), a wide area network (WAN) such as the Internet, or a combination of the two, and can include wired, wireless, or fiber optic connections. In general, network 116 can be any combination of connections and protocols that will support communications between computer 102, servers 118, 124, 130 and 136 in accordance with an embodiment of the invention.

Analytics data processing environment 100 includes servers 118, 124, 130 and 136. In various embodiments of the present invention, servers 118, 124, 130 and 136 can each respectively be a laptop computer, tablet computer, netbook computer, personal computer (PC), a desktop computer, a personal digital assistant (PDA), a smart phone, or any programmable electronic device capable of communicating with computer 102 via network 116. In the example embodiment of FIG. 1, servers 118, 124, 130 and 136 each include persistent storage. For example, server 118 includes persistent storage 120, server 124 includes persistent storage 126, server 130 includes persistent storage 132, and server 136 includes persistent storage 138.

Persistent storage 120, 126, 132, and 138 may, for example, be hard disk drives. Alternatively, or in addition to a magnetic hard disk drive, persistent storage 120, 126, 132, and 138 may include solid state hard drives, semiconductor storage devices, read-only memory (ROM), erasable programmable read-only memory (EPROM), flash memory, or any other computer-readable storage medium that are capable of storing program instructions or digital information. Persistent storage 120, 126, 132, and 138 also contain operating system software, as well as software that enables server 118, 124, 130, and 136 to communicate with computer 102, as well as other computing devices of analytics data processing environment 100 over a data connection on network 116.

Persistent storage 120 includes accounting data 122 that is used by analytics software 112 and other computing devices (not shown) of analytics data processing environment 100. Persistent storage 126 includes sales data 128 that is used by analytics software 112 and other computing devices (not shown) of analytics data processing environment 100. Persistent storage 132 includes supply data 134 that is used by analytics software 112 and other computing devices (not shown) of analytics data processing environment 100. Persistent storage 138 includes manufacturing data 140 that is used by analytics software 112 and other computing devices (not shown) of analytics data processing environment 100.

Figure 2A:
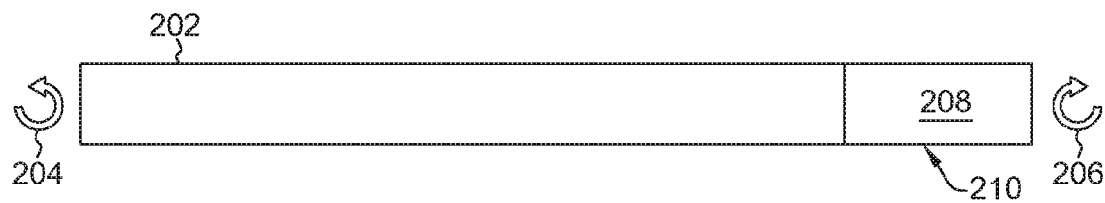
FIG. 2A is a functional block diagram depicting an undo stack in a business analytics software data view, on a computer within the analytics data processing environment of FIG. 1, after a user initializes an application, in an embodiment in accordance with the present invention.

FIG. 2A is a functional block diagram depicting an undo stack in a business analytics software data view, on a computer within the analytics data processing environment of FIG. 1, after a user initializes an application, in an embodiment in accordance with the present invention. In an example embodiment, a user of analytics software 112 opens a saved business analytics software data file that results in the initial data view being added to undo stack 202. The resulting undo stack 202 displays the initial application state 208 as the new current state 210 with undo action 204 and redo action 206 as depicted in FIG. 2A. Initial application state 208 represents the initial state of the application, before any actions have been performed, and current state 210 includes an arrow indicating that initial application state 208 is the current state of the analytics software data view. Undo action 204 allows a user of analytics software 112 to undo a previous action, or revert/adjust to a previous state, in the selected data view. Redo action 206 allows a user of analytics software 112 to re-apply an action or retrieve a state that had an undo action performed on it. In one example embodiment, the undo stack is displayed as a horizontal slide bar on user interface 104, as depicted in FIG. 2A, where the user actions or operations slide into the undo stack from the right. As more operations are performed by the user, the previous operations on the stack slide to the left as the current action in the current view is added. In other example embodiments, the undo stack may be displayed as a vertical slide bar on the left or right side of user interface 104.

Figure 2B:
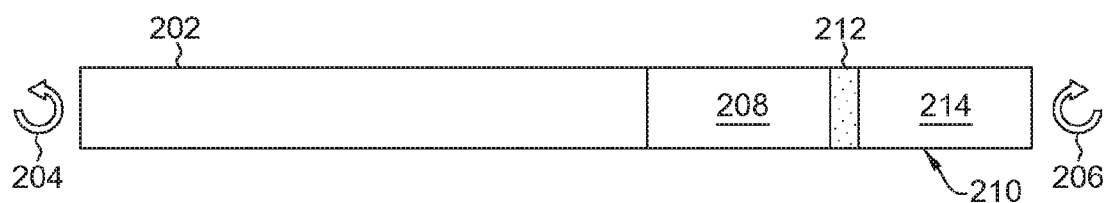
FIG. 2B is a functional block diagram depicting the undo stack in the business analytics software data view, after a user performs a swap operation, in an embodiment in accordance with the present invention.

FIG. 2B is a functional block diagram depicting the undo stack in the business analytics software data view, after a user performs a swap operation, in an embodiment in accordance with the present invention. In an example embodiment, a user of analytics software 112 performs a swap operation in a business analytics software data view that results in the swap operation being added to undo stack 202. The resulting undo stack 202 displays initial application state 208, previous action 212 (which represents the swap operation), and state 214 (which represents, or is associated with, the data view after the swap operation) as the current state 210, as depicted in FIG. 2B. Previous action 212 and state 214 slide in from the right side of undo stack 202, resulting in initial application state 208 moving to the left. Previous action 212, in addition to representing (or "containing") the swap operation, may also contain other previous operations of initial application state 208. An example of this, using FIG. 2B, would be a user clicking on state 208 and saving the stored state of the initial application to use at a later time or send to a colleague. The previous action may include a drop-down menu context or a pop-up window, displaying the previous operations or states of the data view. In one example embodiment, the user of analytics software 112 may be asked to verify adding the current view to undo stack 202 prior to performing the operation (for example, the swap operation). In another example embodiment, previous action 212 may also be used to queue up pending actions to the saved data views, to be applied at a later time. Drop-down contexts and pop-up windows relating to undo stack 202 are described in further detail with respect to FIGS. 3D and 3E.

Figure 2C:
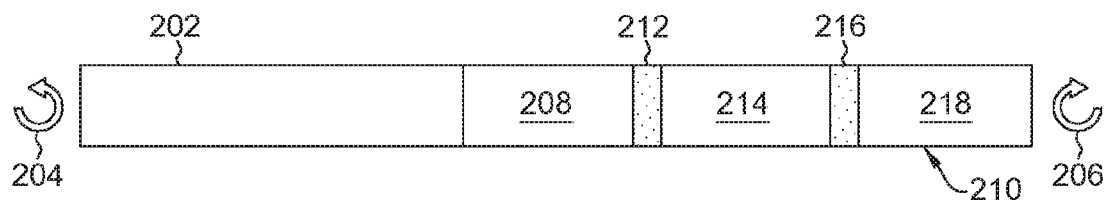
FIG. 2C is a functional block diagram depicting the undo stack in the business analytics software data view, after a user performs a sort operation, in an embodiment in accordance with the present invention.

FIG. 2C is a functional block diagram depicting the undo stack in the business analytics software data view, after a user performs a sort operation, in an embodiment in accordance with the present invention. In an example embodiment, a user of analytics software 112 performs a sort operation in a business analytics software data view that results in the sort operation being added to undo stack 202. The resulting undo stack 202 displays initial application in state 208 with previous action 212, state 214, previous action 216 (which represents the sort operation), and state 218 (which represents the data view after the sort operation) in current state 210, as depicted in FIG. 2C. Previous action 216 and state 218 slide in from the right side of undo stack 202, resulting in initial application in state 208, previous action 212, and state 214 moving to the left. Previous action 216, in addition to representing (or "containing") the sort operation, may also contain other previous operations of state 214. In another example embodiment, the user of analytics software 112 may configure analytics software 112, using user interface 104, prior to performing actions, to add only certain views, operations, and states to undo stack 202. In another example embodiment, analytics software 112 may be able to flag a moment in time using undo stack 202 to indicate when and where analytics data 114 indicates an upward or downward trend.

Figure 2D:
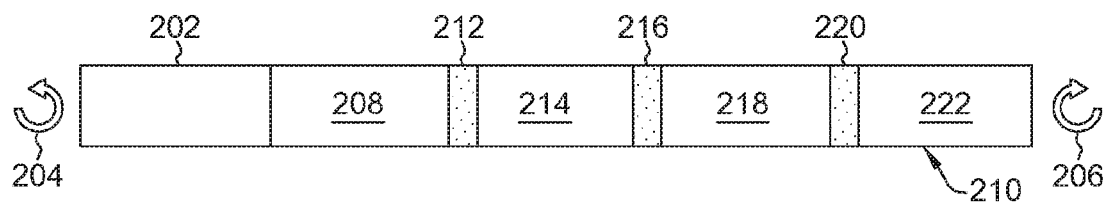
FIG. 2D is a functional block diagram depicting the undo stack in the business analytics software data view, after a user performs a filter operation, in an embodiment in accordance with the present invention.

FIG. 2D is a functional block diagram depicting the undo stack in the business analytics software data view, after a user performs a filter operation, in an embodiment in accordance with the present invention. In an example embodiment, a user of analytics software 112 performs a filter operation in a business analytics software data view that results in the filter operation being added to undo stack 202. The resulting undo stack 202 displays initial application in state 208 with previous action 212, state 214, previous action 216, state 218, previous action 220 (which represents the filter operation), and state 222 (which represents the data view after the filter operation) in current state 210, as depicted in FIG. 2D. Previous action 220 and state 222 slide in from the right side of undo stack 202, resulting in initial application in state 208, previous action 212, state 214, previous action 216, and state 218 moving to the left. Previous action 220, in addition to representing (or "containing") the filter operation, may also contain other previous actions of state 218. In another example embodiment, the undo stack created by analytics software 112 may be saved to continue working at a later time by a user of computer 102. In other example embodiments, analytics software 112 may be able to freeze (e.g., protect data to prevent changes from occurring), in saved data views of undo stack 202.

Figure 2E:
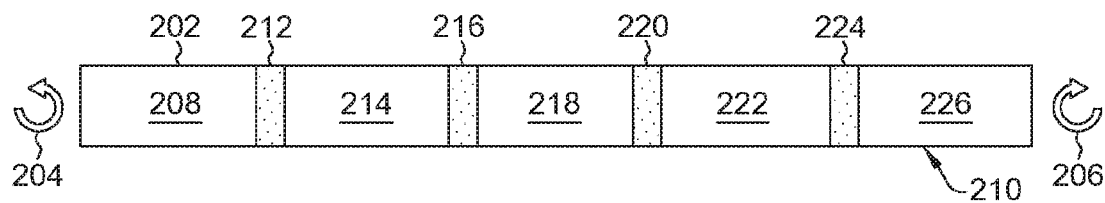
FIG. 2E is a functional block diagram depicting the undo stack in the business analytics software data view, after a user performs a keep operation, in an embodiment in accordance with the present invention.

FIG. 2E is a functional block diagram depicting the undo stack in the business analytics software data view, after a user performs a keep operation, in an embodiment in accordance with the present invention. In an example embodiment, a user of analytics software 112 performs a keep operation in a business analytics software data view that results in the keep operation being added to undo stack 202. The resulting undo stack 202 displays initial application in state 208 with previous action 212, state 214, previous action 216, state 218, previous action 220, and state 222, previous action 224 (which represents the keep operation), and state 226 (which represents the data view after the keep operation) in current state 210 as depicted in FIG. 2E. Previous action 224 and state 226 slide in from the right side of undo stack 202, resulting in initial application in state 208, previous action 212, state 214, previous action 216, state 218, previous action 220, state 222, and previous action 224 moving to the left. Previous action 224, in addition to representing (or "containing") the keep operation, is used to contain the previous actions and/or states of state 222. In another example embodiment, the undo stack created by analytics software 112 may be saved and exported to other computing devices (not shown) of analytics data processing environment 100. In other example embodiments, analytics software 112 may use undo stack 202 to create macros to manipulate, perform calculations, or projections on analytics data 114 and/or accounting data 122, and/or sales data 128, and/or supply data 134, and/or manufacturing data 140.

Figure 3A:
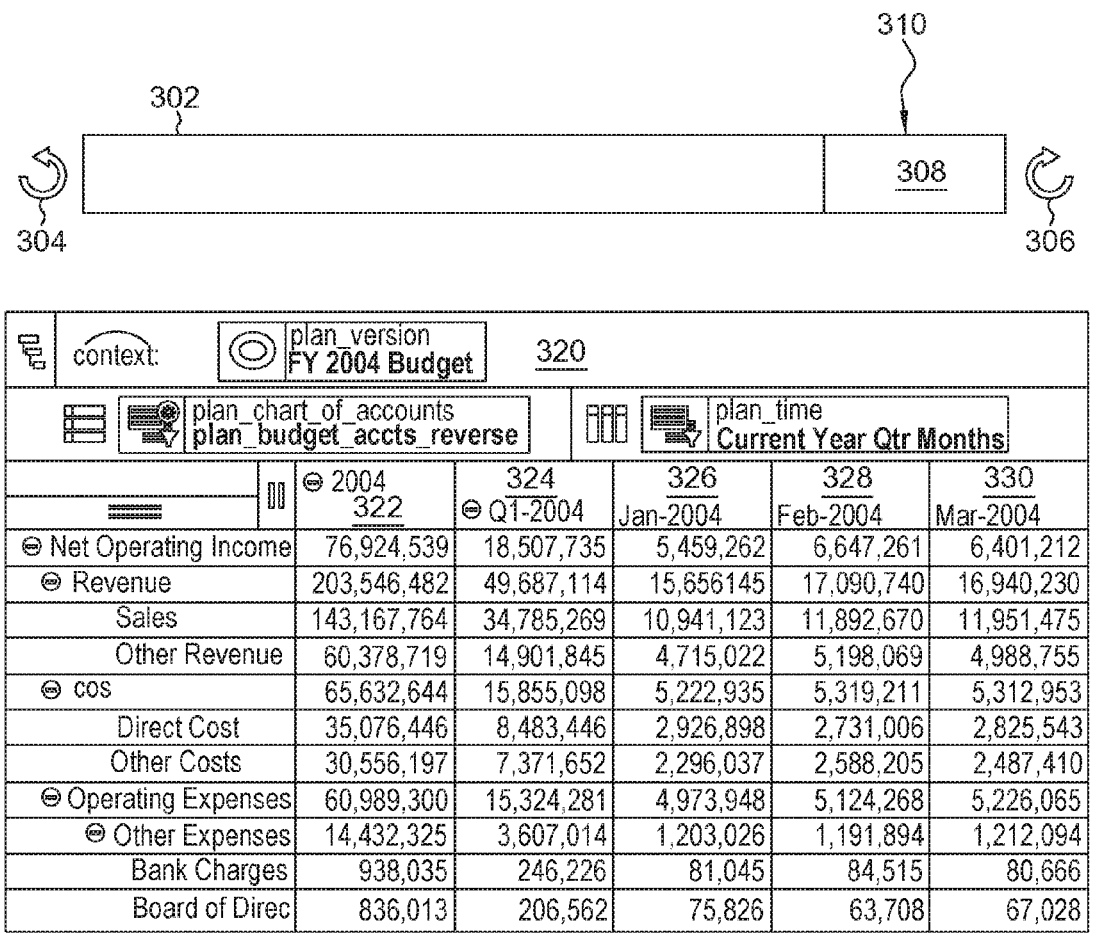
FIG. 3A is an example business analytics software data view with an undo stack, on a computer within the analytics data processing environment of FIG. 1, in an embodiment in accordance with the present invention.

FIG. 3A is an example business analytics software data view with an undo stack, on a computer within the analytics data processing environment of FIG. 1, in an embodiment in accordance with the present invention. In an example embodiment, a user opens a data file using analytics software 12, to view, update, and/or delete business analytics data (e.g., analytics data 114) from one or more repositories (e.g., accounting data 122 on server 118, sales data 128 on server 124, supply data 134 on server 130, and manufacturing data 140 on server 136). Analytics software 112 opens the data file and populates user interface 104 with the saved data as shown in application view 320 and depicted in FIG. 3A. Application view 320 contains undo stack 302 with state 308 as the current state 310. State 308 represents the initial state of the application, before any actions have been performed, and current state 310 includes an arrow indicating that initial application state 308 is the current state of the analytics software data view. Application view 320 includes a cross table with data column "2004" 322, data column "Q1-2004" 324, data column "Jan-2004" 326, data column "Feb-2004" 328, and data column "Mar-2004" 330. Undo stack 302 contains undo action 304 and redo action 306 to undo or redo previous actions. A cross table is a two-way table, also referred to as a pivot table or a multi-dimensional table, consisting of columns and rows where data is rendered based on results of queries on one or more databases (e.g., accounting data 122, sales data 128, supply data 134, and manufacturing data 140). Its greatest strength is its ability to structure, summarize and display large amounts of data. In other example embodiments, undo action 304 and redo action 306 may both be greyed out, or not be selectable, by a user until an action or operation is performed and stored in undo stack 302.

Figure 3B:
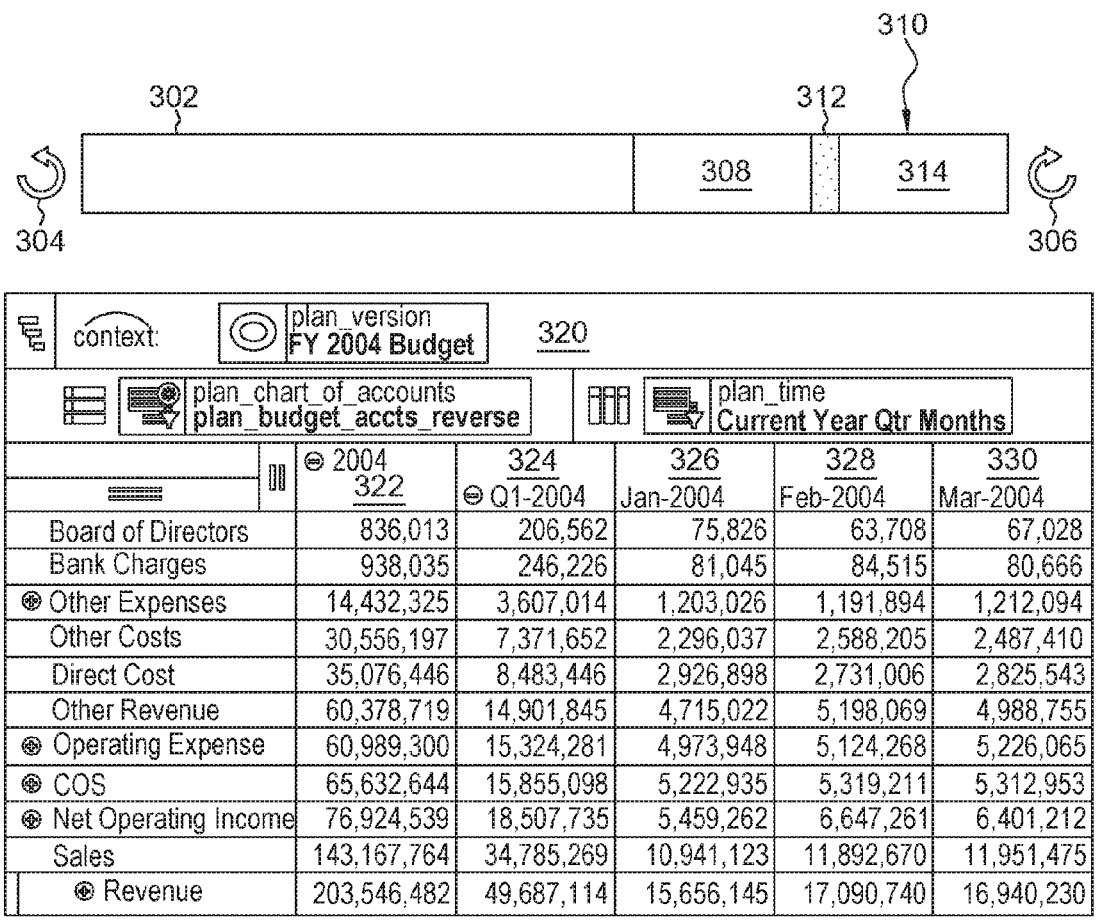
FIG. 3B is an example business analytics software data view with an undo stack, on a computer within the analytics data processing environment of FIG. 1, after a user selects an action to perform a "sort ascending" operation, in an embodiment in accordance with the present invention.

FIG. 3B is an example business analytics software data view with an undo stack, on a computer within the analytics data processing environment of FIG. 1, after a user selects an action, or entry, to perform a "sort ascending" operation, in an embodiment in accordance with the present invention. In an example embodiment, a user performs a "sort ascending" operation on application view 320 to arrange the data contained in data column "2004" 322, data column "Q1-2004" 324, data column "Jan-2004" 326, data column "Feb-2004" 328, and data column "Mar-2004" 330 from lowest to highest. In other example embodiments, a user may sort the data contained in application view alphabetically, or by date. In general, analytics software 112 and application view 320 may perform any programmable computing operation on computer 102 or a computing device of analytics data processing environment 100.

The resulting undo stack 302 displays the initial application state 308, previous action 312 (which represents the "sort ascending" operation), and state 314 (which represents the data view after the "sort ascending" operation) as the current state 310, as depicted in FIG. 3B. Previous action 312 and state 314 slide in from the right side of undo stack 302, resulting in the initial application state 308 moving to the left. Previous action 312, in addition to representing (or "containing") the "sort ascending" operation, may also contain other previous operations of initial application state 308. Undo action 304 would allow the user to adjust application view 320 back to the original data view in state 308. Redo action 306 would be greyed our, or not selectable by the user in current data view 324. Application view 320 in current state 310 now shows the data contained in data column "2004" 322, data column "Q1-2004" 324, data column "Jan-2004" 326, data column "Feb-2004" 328, and data column "Mar-2004" 330 arranged from lowest to highest. In one example embodiment, a user of computer 102 may use voice commands to perform operations using analytics software 112.

Figure 3C:
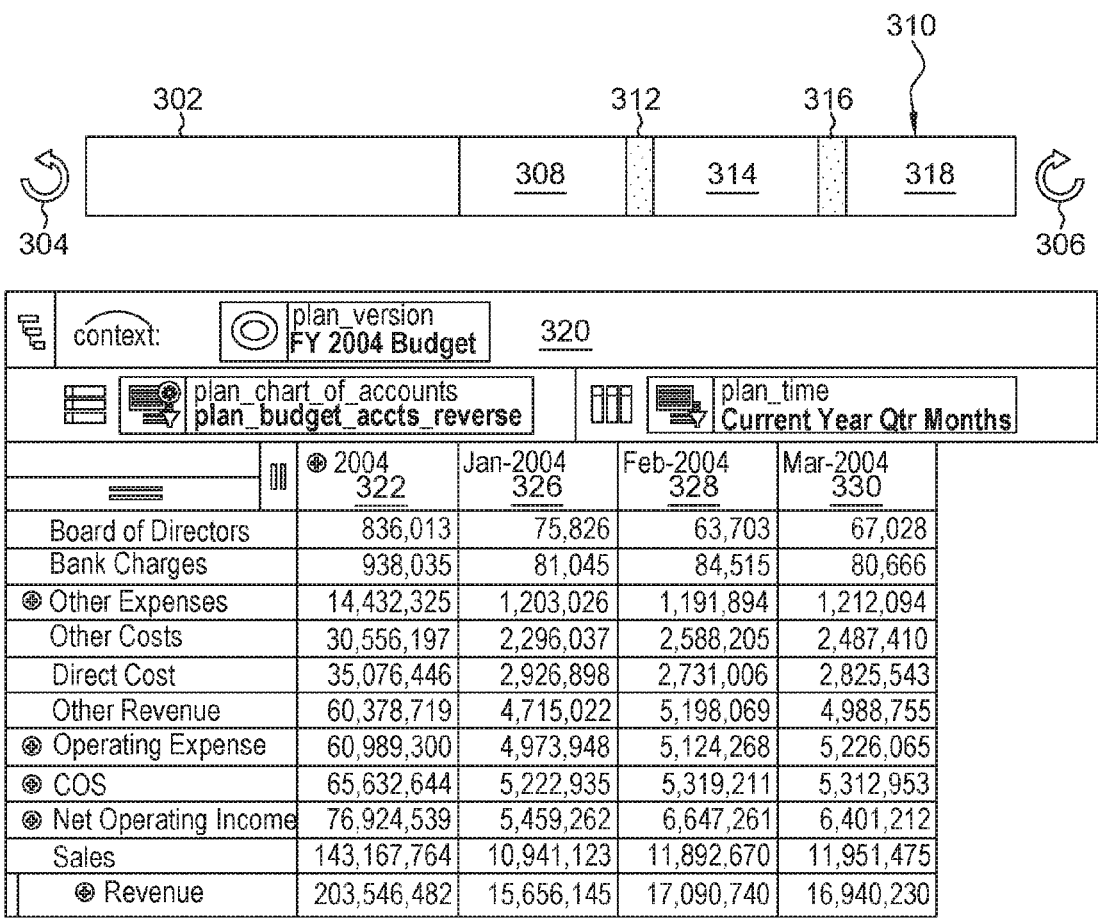
FIG. 3C is an example business analytics software data view with an undo stack, on a computer within the analytics data processing environment of FIG. 1, displaying the current view after a user selects an action to perform a "hide column" operation, in an embodiment in accordance with the present invention.

FIG. 3C is an example business analytics software data view with an undo stack, on a computer within the analytics data processing environment of FIG. 1, displaying the current view after a user selects an action to perform a "hide column" operation in an embodiment in accordance with the present invention. In an example embodiment, a user performs a "hide column" operation on application view 320 to hide column "Q1-2004" 324 from view on application view 320. The resulting undo stack 302 displays the initial application state 308, previous action 312, state 314, previous action 316 (which represents the "hide column" operation), state 318 (which represents the data view after the "hide column" operation) in current state 310, undo action 304, and redo action 306 as depicted in FIG. 3C. Previous action 316 and state 318 slide in from the right side of undo stack 202, resulting in initial application in state 308, previous action 312, and state 314 moving to the left. Previous action 316, in addition to representing (or "containing") the "hide column" operation, may also contain other previous operations of state 314. Application view 320 in current state 310 now shows the data contained in data column "2004" 322, data column "Jan-2004" 326, data column "Feb-2004" 328, and data column "Mar-2004" 330 arranged from lowest to highest, and data column "Q1-2004" 324 no longer visible. Undo action 304 would allow the user to revert application view 320 back to the previous state 314 when the user performed the "hide column" operation. Redo action 306 would be greyed out, or not selectable by the user in current state 310 unless undo action 304 was performed. In other example embodiments, analytics software 112 may automatically save, or write to persistent storage 110, all updates to undo stack 302, where the updates include all actions performed on the data view, and data states.

FIG. 3D is an example business analytics software data view with an undo stack, on a computer within the analytics data processing environment of FIG. 1, displaying the action taken on a previous view in the undo stack, in an embodiment in accordance with the present invention. In an example embodiment, a user clicks on, or hovers over, previous action 312 to view the previous action that was performed by the user on application view 320 for state 308. Undo stack 302 displays the initial application state 308, previous action 312, state 314, previous action 316, state 318 in current state 310, undo action 304, and redo action 306 as depicted in FIG. 3D. Analytics software 112 provides the user with drop-down menu 332, also referred to as a pop-up window menu (or a "drop-down"), displaying the previous operation (e.g., "sort ascending") that was performed on state 308. Drop-down 332 is labeled "Action" and contains the previous action "sort ascending" that was performed on state 308. Drop-down 332 is an example UI drop-down. In general, any programmed graphical user interface menu may be used to display the information in drop-down 332.

Figure 3E:
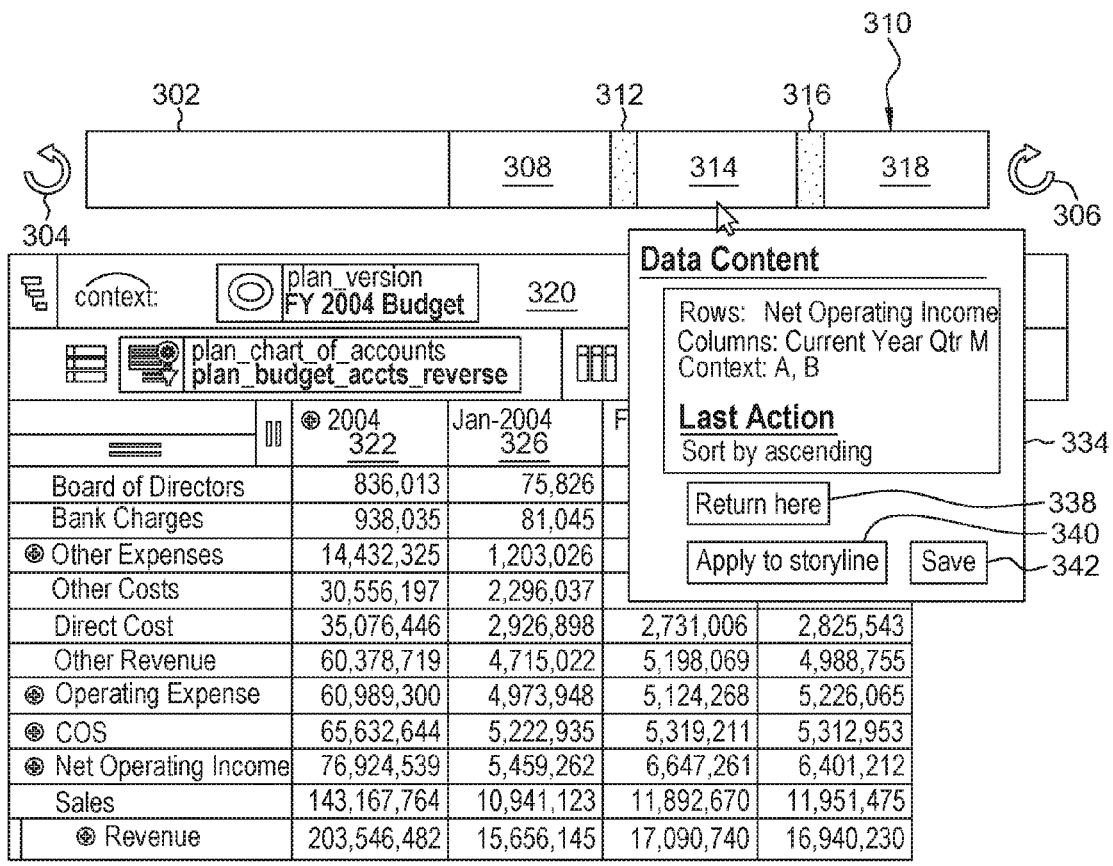
FIG. 3E is an example business analytics software data view with an undo stack in, on a computer within the analytics data processing environment of FIG. 1, displaying the contents and last action of a previous view in the undo stack with available actions, in an embodiment in accordance with the present invention.

FIG. 3E is an example business analytics software data view with an undo stack, on a computer within the analytics data processing environment of FIG. 1, displaying the contents and last action of a previous view in the undo stack with available actions, in an embodiment in accordance with the present invention. In an example embodiment, a user clicks on, or hovers over, state 314 to display a summary of the previous data view and the previous action that was performed by the user on application view 320. Undo stack 302 displays the initial application state 308, previous action 312, state 314, previous action 316, state 318 in current state 310, undo action 304, and redo action 306 as depicted in FIG. 3E. Analytics software 112 provides the user with a drop-down menu 334, also referred to as a pop-up window menu (or a "drop-down"), labeled "Data Content" that displays a summary of the previous data view (e.g., the original data from state 314) and the last action that was performed.

Drop-down 334 also contains clickable push buttons labeled "Return here" 338, "Apply to storyline" 340, and "Save" 342. The "Return here" 338 push button allows the user to return application view 320 to the previous state of state 314. Upon selecting "Return here" 338 by the user, analytics software 112 reverts application view 320 back to state 314 and results in state 314 being the current state 310. The "Apply to storyline" 340 push button enables a user of analytics software to add the selected data view to a presentation, or import the selected data view to another spreadsheet, or add the selected data view to an infographic. An infographic, also referred to as an information graphic, is a graphic visual representation of information, data or knowledge intended to present information quickly and clearly. The "Save" 342 push button enables the user of analytics software 112 to save the selected data view to an undo stack file for sharing with other computing devices in analytics data processing environment 100, and/or for later editing, updating, or viewing. In general, analytics software 112 may detect and respond to any programmable UI element in application data view 320 and undo stack 302.

Figure 4:
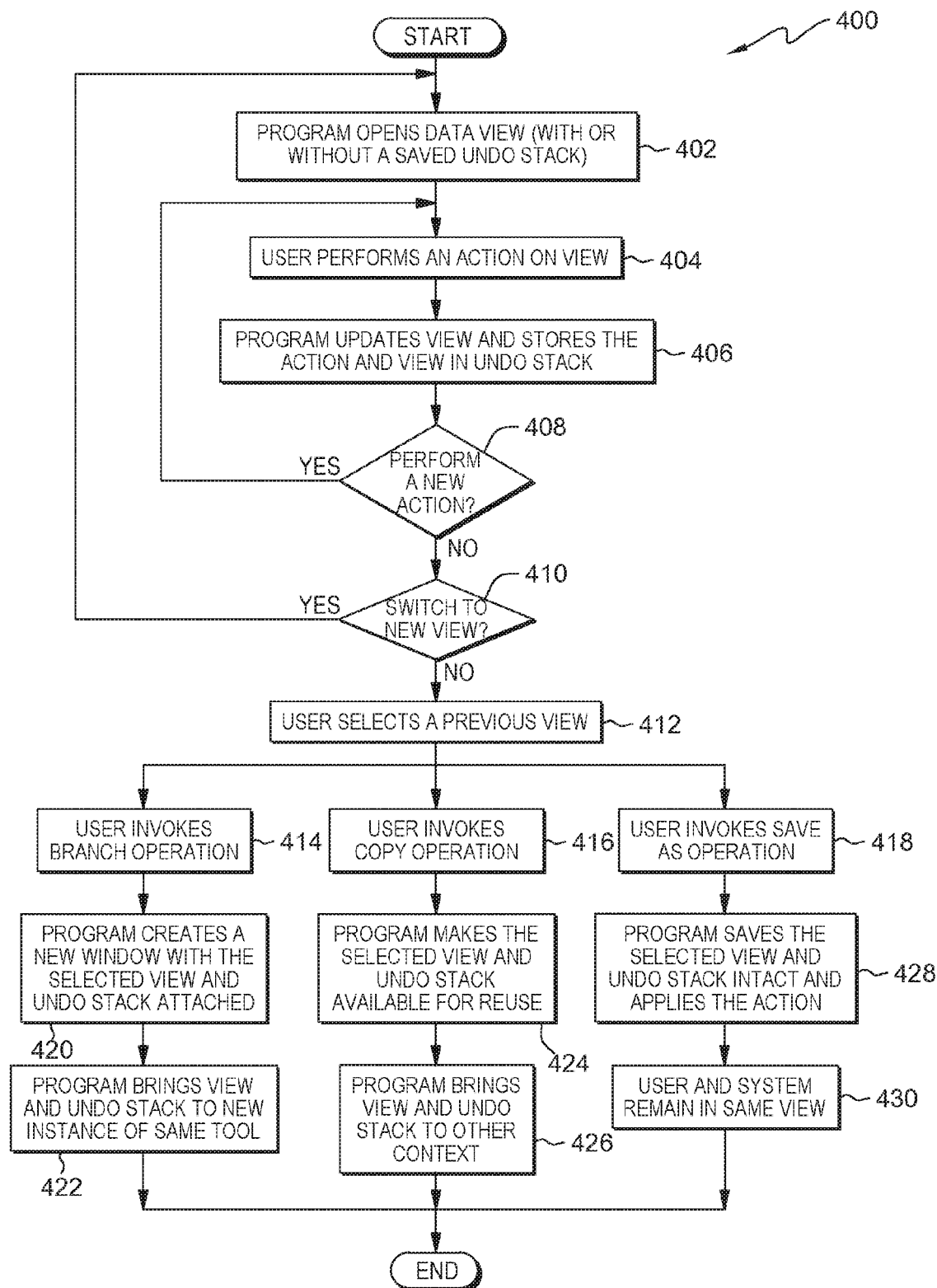
FIG. 4 is a flowchart depicting operational steps of analytics software, performing operations using an undo stack for various analytic views on a client device within the analytics data processing environment of FIG. 1, in an embodiment in accordance with the present invention.

FIG. 4 is a flowchart, generally designated 400, depicting operational steps of an analytics software, performing operations using an undo stack for various analytic views on a client device within the analytics data processing environment of FIG. 1, in an embodiment in accordance with the present invention. A user of analytics software 112, on computer 102, opens an initial data view for analytics data 114 and/or analytics data on server 118, 124, 130, and/or 136 (e.g., accounting data 122, sales data 128, supply data 134, and manufacturing data 140), as depicted in step 402. In one example embodiment, analytics data may open with a saved undo stack. A user may click on a file, with the use of user interface 104, and the operating system of computer 102, based on the file extension, launches or begins execution of analytics software 112 and populates the saved undo stack in the data view once analytics data 114 is loaded.

In step 404, a user performs an action on a view using user interface 104 and analytics software 112. Examples of actions that may be performed include, but are not limited to, an expand operation, a swap operation, a sort operation, a filter operation, a keep operation, a select operation, a store operation, a flag operation, a branch operation, an access operation, restructuring the data view by moving content from the rows to the columns and vice versa, changing filters that apply to the data cells of the view, hiding values, filtering values, adding data, expanding or collapsing data values, drill down or drill up on values, spread data values, applying various formats to data values, and showing totals as trailing or leading. In one example embodiment, the user performs an expand operation of a range of data stored in analytics data 114. Analytics software 112 populates user interface 104 with the specified data from analytics data 114 and/or accounting data 122, and/or sales data 128, and/or supply data 134, and/or manufacturing data 140.

Analytics software 112 updates the view on user interface 104 and adds, or slides in, the expand operation to the undo stack and places the expand operation in the current view as illustrated in FIG. 2A and depicted in step 406. If there are previous operations on the undo stack, analytics software 112 inserts a previous action between the two operations as depicted by previous action 212 in FIG. 2B. In other example embodiments, a user may schedule actions to be performed by analytics software 112 by creating an undo stack with operations and desired states to be carried out by analytics software 112 at a specified time.

In decision step 408, analytics software 112 checks if the user has performed another action on the current view. If a new action has been performed for the current view ("Yes" branch, decision 408), analytics software 112 populates user interface 104 with the new data and repeats steps 404 and 406 for any actions or operations the user makes on the current view. In other example embodiments, analytics software 112 may display multiple views on user interface 104, or across multiple display monitors attached to computer 102.

If there are no more actions on the current view ("No" branch, decision 408), analytics software 112 checks if the user has switched to another view as depicted in decision step 410. If the user has switched to a new view ("Yes" branch, decision 410), analytics software 112 repeats steps 402 through 408. In other example embodiments, analytics software 112 may use, or load, undo stacks of previous actions (i.e., from saved histories or saved undo stacks), when switching views. A user may be presented with the option, using user interface 104, to select saved undo stacks, or previous actions within the saved undo stacks, to use when initializing the data view. In another example embodiment, analytics software 112 may allow a user to select several undo stacks, and turn the previous actions and saved states of the undo stacks into a movie showing all the previous saved actions and states of the undo stacks in a step-by-step animation.

If the user has not switched to a new view ("No" branch, decision 410), analytics software 112 waits until the user selects a previous view as depicted in step 412. In one example embodiment, a user invokes, or performs, a branch operation on a previous view as depicted in step 414 and/or a user invokes, or performs, a copy operation on a previous view as depicted in step 416, and/or a user invokes, or performs, a "save as" operation on a previous view as depicted in step 418. If the user invokes, or performs, a copy operation, analytics software 112 creates a new window with the selected view and the undo stack attached as depicted in step 420. In other example embodiments, analytics software 112 may open the new data view in a new tabbed document interface (TDI), also referred to as a tab, within the existing window. In interface design, a tabbed document interface refers to a graphical control element that allows multiple documents or panels to be contained within a single window, using tabs as a navigational widget for switching between sets of documents or views. In step 422, analytics software brings the new view and undo stack of the new instance for the user. The new data view is displayed, along with the undo stack, for the user to view and/or perform operations on.

If a user invokes, or performs, a copy operation on a previous view as depicted in step 416, analytics software 112 copies the data and the undo stack in the selected view, then makes the selected view available for reuse. Using FIG. 2D as an example, the user selects state 214, and selects copy. Analytics software 112 then copies the data and the undo stack in selected state 214 together with previous action 212 and makes selected view 214 available for reuse as depicted in step 424. Analytics software 112 then brings the view and undo stack back to the current view 210 as depicted in step 426. In one example embodiment, the previous actions, when selected, may provide the user with a drop-down menu displaying the previous operations and states of the data view. In another example embodiment, the previous actions, when selected, may provide the user with a pop-up window menu displaying the previous operations and states of the data view.

If a user invokes, or performs, a "save as" operation on a previous view as depicted in step 418, analytics software 112 provides a user with a drop-down, or pop-up window context asking the user to input a file name for the undo stack. In one example embodiment, analytics software 112 automatically generates a filename and displays the filename for the user to modify if needed. Analytics software 112 then saves the selected view and undo stack and applies any pending actions the user may not have applied to the view as depicted in step 428. The user and system remain in the current view throughout the performed "save as" operation by analytics software 112 as depicted in step 430.

FIG. 5 depicts a block diagram, generally designated 500, of components of the computer executing the analytics software, in an embodiment in accordance with the present invention. It should be appreciated that FIG. 5 provides only an illustration of one implementation and does not imply any limitations with regard to the environments in which different embodiments may be implemented. Many modifications to the depicted environment may be made.

Computer 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Analytics software 112 and analytics data 114 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 116 and server 118, 124, 130, and 136. In these examples, communications unit 510 includes one or more network interface cards. Communications unit 510 may provide communications through the use of either or both physical and wireless communications links. Analytics software 112 and analytics data 114 may be downloaded to persistent storage 508 through communications unit 510.

I/O interface(s) 512 allows for input and output of data with other devices that may be connected to computer 102. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., analytics software 112 and analytics data 114, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for using an undo stack to explore past actions and apply new actions to previous states in a data view, the computer system comprising:
   one or more computer processors;
   one or more computer readable storage media;
   program instructions stored on the computer readable storage media for execution by at least one of the one or more processors, the program instructions comprising:
   program instructions to provide a user interface allowing a user to perform operations on undo stack entries in a business analytics data view, wherein the performable operations include filtering data values, expanding data values, collapsing data values, drilling down on data values, drilling up on data values, applying formats to data values, showing totals as trailing, and showing totals as leading;
   program instructions to detect a first change in the business analytics data view;
   program instructions to, responsive to detecting the first change in the business analytics data view, display a first undo stack entry representing a state of the business analytics data view corresponding to the business analytics data view prior to the detected change, and a second undo stack entry representing a first current state of the business analytics data view;
   program instructions to, upon detecting the first change in the business analytics data view and displaying the first undo stack entry and the second undo stack entry, detect a second change in the business analytics data view;
   program instructions to, responsive to detecting the second change in the business analytics data view, display a third undo stack entry representing a second current state of the business analytics data view;

program instructions to, upon detecting the second change in the business analytics data view and displaying the third undo stack entry, detect a third change in the business analytics data view;

program instructions to, responsive to detecting the third change in the business analytics data view, display a fourth undo stack entry representing a third current state of the business analytics data view;

program instructions to detect a selection of a branch operation for one of the first undo stack entry, the second undo stack entry, and the third undo stack entry;

program instructions to, responsive to detecting the selection of the branch operation, apply the branch operation to the state of the business analytics data view represented by the branch operation's respective undo stack entry, wherein applying the branch operation creates and displays a new window that includes the undo stack and the business analytics data view represented by the branch operation's respective undo stack entry;

program instructions to detect a selection of a copy operation for one of the first undo stack entry, the second undo stack entry, and the third undo stack entry;

program instructions to, responsive to detecting the selection of the copy operation, apply the copy operation to the state of the business analytics data view represented by the copy operation's respective undo stack entry, wherein applying the copy operation makes the business analytics data view represented by the copy operation's respective undo stack entry available for reuse while remaining in the new current state of the business analytics data view;

program instructions to detect a selection of a save as operation for one of the first undo stack entry, the second undo stack entry, and the third undo stack entry;

program instructions to, responsive to detecting the selection of the save as operation, apply the save as operation to the state of the business analytics data view represented by the save as operation's respective undo stack entry, wherein applying the save as operation allows the user to save the business analytics data view represented by the save as operation's respective undo stack entry while remaining in the new current state of the business analytics data view;

program instructions to detect a selection of one of the first undo stack entry, the second undo stack entry, and the third undo stack entry; and program instructions to, responsive to detecting the selection of one of the first undo stack entry, the second undo stack entry, and the third undo stack entry, return the business analytics data view to the state represented by the selected undo stack entry.

\* \* \* \* \*